(12) United States Patent
Kanamatareddy et al.

(10) Patent No.: US 11,449,769 B2
(45) Date of Patent: Sep. 20, 2022

(54) COGNITIVE ANALYTICS FOR GRAPHICAL LEGACY DOCUMENTS

(71) Applicant: INTERNATIONAL BUSINESS MACHINES CORPORATION, Armonk, NY (US)

(72) Inventors: Ravi Kumar Reddy Kanamatareddy, Hyderabad (IN); Gottumukkala Venkata Kalyan Rajesh, Hyderabad (IN); Souvik Das, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 16/381,168

(22) Filed: Apr. 11, 2019

(65) Prior Publication Data
US 2020/0327429 A1 Oct. 15, 2020

(51) Int. Cl.
*G06F 16/00* (2019.01)
*G06N 5/04* (2006.01)
*G06F 16/93* (2019.01)
*G06F 16/29* (2019.01)

(52) U.S. Cl.
CPC .......... *G06N 5/04* (2013.01); *G06F 16/29* (2019.01); *G06F 16/93* (2019.01)

(58) Field of Classification Search
CPC ..................................................... G06F 16/29
USPC ....................................................... 707/756
See application file for complete search history.

(56) References Cited

U.S. PATENT DOCUMENTS

| 8,204,966 B1 * | 6/2012 | Mendis | G01C 21/32 709/224 |
| 8,280,414 B1 * | 10/2012 | Nourse | G06F 16/9574 455/457 |
| 8,711,171 B2 * | 4/2014 | Sano | G06T 19/20 345/589 |

(Continued)

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Alexandria Y Bromell
(74) *Attorney, Agent, or Firm* — Schmeiser, Olsen & Watts; Michael A. Petrocelli

(57) ABSTRACT

A cognitive cartography system receives a set of legacy documents, such as maps, in the form of physical hardcopy or as simple graphic images. The system, using rules derived from prior training and experience, revises the documents to resolve formal inconsistences like differences in resolution, orientation, or scale. The system assembles the adjusted documents into a seamless composite document represented as a computerized model. Applying learned rules and logic to contextual information received from extrinsic sources, the system infers semantic meaning from features represented by the composite, such as geographical features of a map. These inferences allow the system to derive new knowledge about the represented features, which is added to the model. When additional documents or contextual information are received, the system further refines the model by repeating this procedure. When the model has been sufficiently refined, the system makes the knowledge available to downstream systems.

20 Claims, 5 Drawing Sheets

(56) References Cited

U.S. PATENT DOCUMENTS

| | | | | |
|---|---|---|---|---|
| 8,797,740 | B2* | 8/2014 | Campbell | H05K 7/20763 |
| | | | | 361/699 |
| 8,886,715 | B1* | 11/2014 | Zhu | G06F 16/957 |
| | | | | 709/219 |
| 8,983,774 | B2 | 3/2015 | Gao | |
| 9,063,951 | B1* | 6/2015 | Zhu | G06F 16/9574 |
| | | | | 707/707 |
| 9,197,713 | B2* | 11/2015 | Nourse | G01C 21/26 |
| | | | | 707/707 |
| 9,280,843 | B1 | 3/2016 | Cui | |
| 9,305,107 | B2* | 4/2016 | Siliski | H04L 67/52 |
| | | | | 707/707 |
| 9,332,387 | B2* | 5/2016 | Davis | H04W 4/021 |
| | | | | 707/707 |
| 9,430,858 | B1* | 8/2016 | Har | G06T 11/206 |
| | | | | 707/707 |
| 9,953,443 | B2* | 4/2018 | Limberger | G06T 19/00 |
| | | | | 707/707 |
| 10,366,523 | B2* | 7/2019 | Chen | G06T 17/05 |
| | | | | 707/707 |
| 2007/0198951 | A1* | 8/2007 | Frank | G06F 16/48 |
| | | | | 707/E17.026 |
| 2013/0073387 | A1* | 3/2013 | Heath | G06Q 30/02 |
| | | | | 705/14.53 |
| 2014/0118494 | A1* | 5/2014 | Wu | H04N 13/261 |
| | | | | 348/E13.02 |
| 2015/0019531 | A1* | 1/2015 | Bursey | G06F 16/29 |
| | | | | 707/736 |
| 2018/0276863 | A1 | 9/2018 | Nerurkar | |

OTHER PUBLICATIONS

Alnounou, Yasser et al.; Occupancy Grid Map Merging Using Feature Maps; 10.2316/P.2010.706-074; 2010; 9 pages.

Park, Jinyoung et al.; Map Merging of Rotated, Corrupted, and Different Scale Maps Using Rectangular Features; 2016 IEEE/ION Position, Location and Navigation Symposium; Apr. 11-14, 2016; pp. 535-543.

Zhang, Wen et al.; A Mapping Method of Integrating Multi-Scale River Thematic Maps; The International Archives of the Photogrammetry, Remote Sensing and Spatial Information Sciences, vol. XLII-2/W7, 2017 ISPRS Geospatial Week 2017, Sep. 18-22, 2017; pp. 573-577.

* cited by examiner

COGNITIVE ANALYTICS FOR GRAPHICAL LEGACY DOCUMENTS

BACKGROUND

The present invention relates in general to cognitive analysis of graphical images and in particular to inferring semantic meaning and other types of knowledge from graphical features of legacy maps.

Legacy documents, such as maps, that are available in hardcopy form or as bitmapped images do not associate semantic meaning to features represented as graphical objects. It is possible to translate such graphical documents into a vector format or other format capable of accommodating metadata that associates certain features with semantic meanings. However, the process of vectorizing a legacy map can result in the loss or distortion of map features.

Combining multiple legacy maps into a single larger map can require at least some of the original maps to be rescaled, rotated, or otherwise modified in order to properly align the original maps. Known solutions can perform these preprocessing steps, if at all, only through manual revision of each map by a human operator. Worse, even when these operations are under human supervision, they can produce further loss or distortion of detail.

Furthermore, even if a digital cartographer manually assigns semantic meaning to features of a legacy map, merging that map with other legacy maps can result in the loss of at least some of that semantic information. Differences in the ways that each legacy map represents various features makes it difficult to extrapolate a source legacy map's associated meanings to similar features located in other regions of the merged map.

SUMMARY

Embodiments of the present invention include cognitive cartography systems, methods, and computer program configured to perform a method for cognitive analytics for graphical legacy documents. The cognitive cartography system receives a set of legacy maps in the form of physical hardcopy documents or as simple bitmapped graphic images. Using rules derived from prior machine-learning training sessions, experience gained from prior performances of the method, and feedback received from downstream systems, the system revises the legacy maps to resolve formal inconsistences, such as differences in resolution, orientation, or scale. The system assembles the adjusted maps into a seamless composite map that contains cognitively generated map information, and then represents this map and information as a computerized model. Applying the learned rules and logic to contextual information received from extrinsic sources, the system infers semantic meaning from features of the geographical area represented by the composite map and any associated virtual map information. These inferences allow the system to intelligently derive new knowledge about the represented area, which is then added to the existing version of the model. When additional maps or contextual information are received, the system further refines the model and the knowledge it contains by repeating this procedure. When the model or the knowledge is deemed to be sufficiently refined, the system forwards or otherwise makes the knowledge available to downstream recipients like engineering teams or software applications.

DETAILED DESCRIPTION

Figure 1:
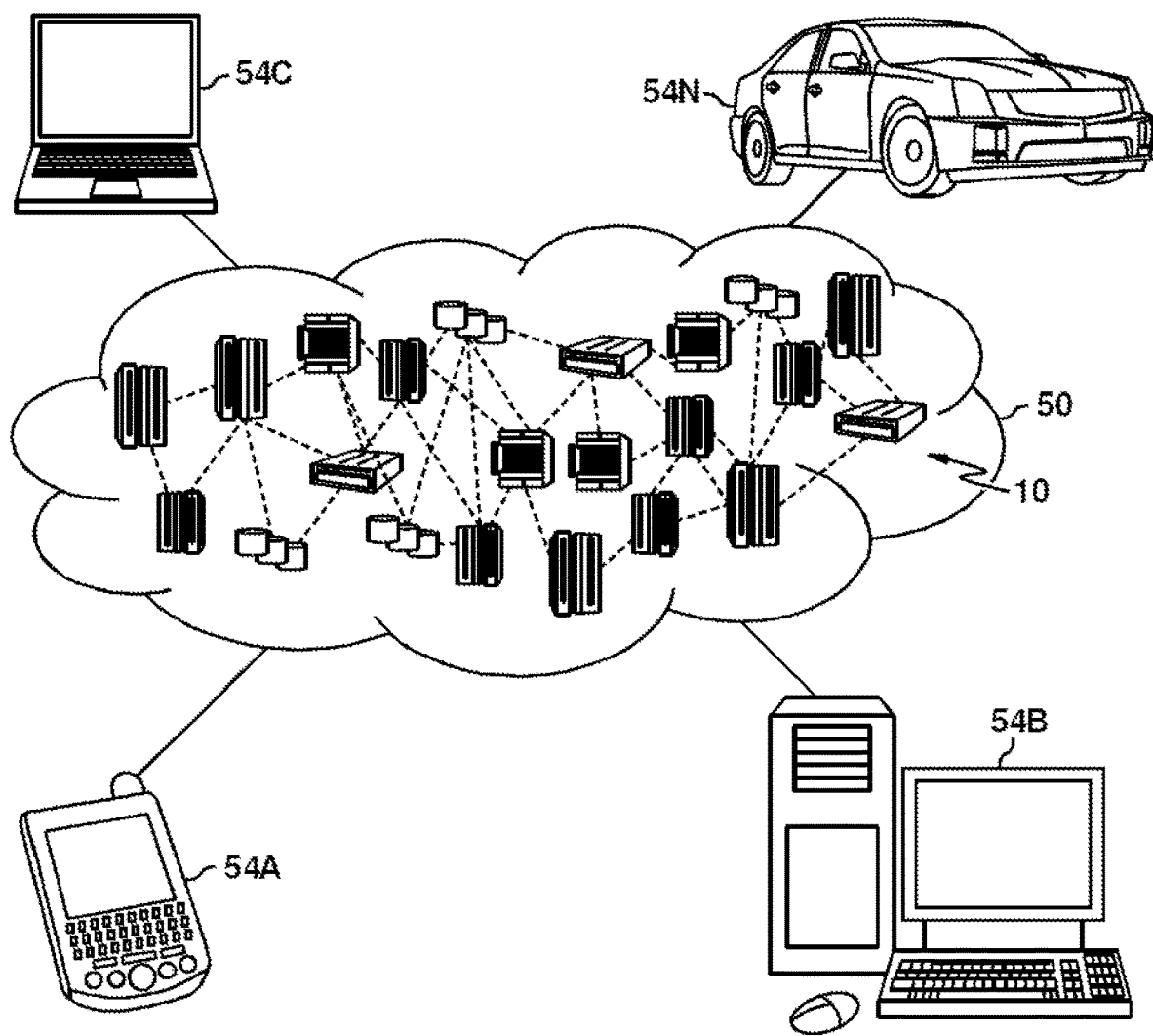
FIG. 1 depicts a cloud computing environment according to an embodiment of the present invention.

Large numbers of legacy maps exist in printed hardcopy form or as digital bitmapped-images. These maps may use significantly different graphical objects to represent features like streets and highways, hiking trails, geographical and political borders, rivers and streams, or bodies of water.

Legacy maps may also differ in other ways. They may be drawn to different scales, contain different degrees of detail, have different bitmapped resolutions, assign different meanings to specific colors, or show objects from different perspectives. Orientation can vary, such that a north-to-south boundary may appear as a vertical line on one map and a horizontal line on another map. Legacy maps can also suffer from worn or damaged areas that cannot be read or may have lost detail when being scanned or digitized.

Specialized maps like topographic maps, transit maps, and weather maps sometimes contain features that are not found, or that have different meanings, in other types of maps. For example, a topographic map contains unique contour lines that indicate vertical elevation, and symbols that represent transfer points and train stations on a subway map may represent state capitols and historic sites on another map.

Projection methods also make a difference. There are many ways to project a three-dimensional surface onto a two-dimensional map, each of which can produce different results. For example, a world map produced through a cylindrical Mercator projection may represent the relative size of landmasses at different latitudes differently than do maps generated by other types of map projections.

Many archival maps of great historic value can also be inaccurate or inconsistent because they were based on the limited knowledge that had been available when they were originally drawn. Early European explorers, for example, produced numerous maps of the New World, but those maps would be difficult to overlay onto a modern satellite image of North America. It would even be difficult to align many of these first-generation maps with each other.

One problem common to nearly all legacy maps is their inability to store or accommodate embedded knowledge. Although a human may quickly realize that a certain symbol represents a highway rest stop on one map and a trailhead on another, printed and simple bitmapped graphical maps cannot associate map-specific semantic meaning with that symbol. Therefore, an automated system attempting to process a legacy map has no way to know the intended meaning of every graphical feature on that map.

Current computerized mapmaking systems and other types of image-processing technologies may allow a user to manually enter metadata or other types of information that is to be associated a graphical feature of a legacy map. But this method is too cumbersome to be impractical with any but the simplest legacy maps.

Embodiments of the present invention address these problems with an improvement to current computerized-cartography technology that allows a self-learning computerized system to intelligently resolve incompatibilities among legacy maps, fit or overlay those maps into a larger composite map, and infer semantic meaning from features of the composite map. These embodiments then use methods of artificial intelligence to derive knowledge from the inferences and to store that derived knowledge in a knowledge-base that may be accessed by downstream systems.

Embodiments provide a practical application of this inventive concept by inferring semantic meanings from graphical features of legacy maps, translating those inferences into rules, data, and other types of meaningful information, and then forwarding the resulting knowledge to other systems without requiring the physical or digital assembly of composite maps.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
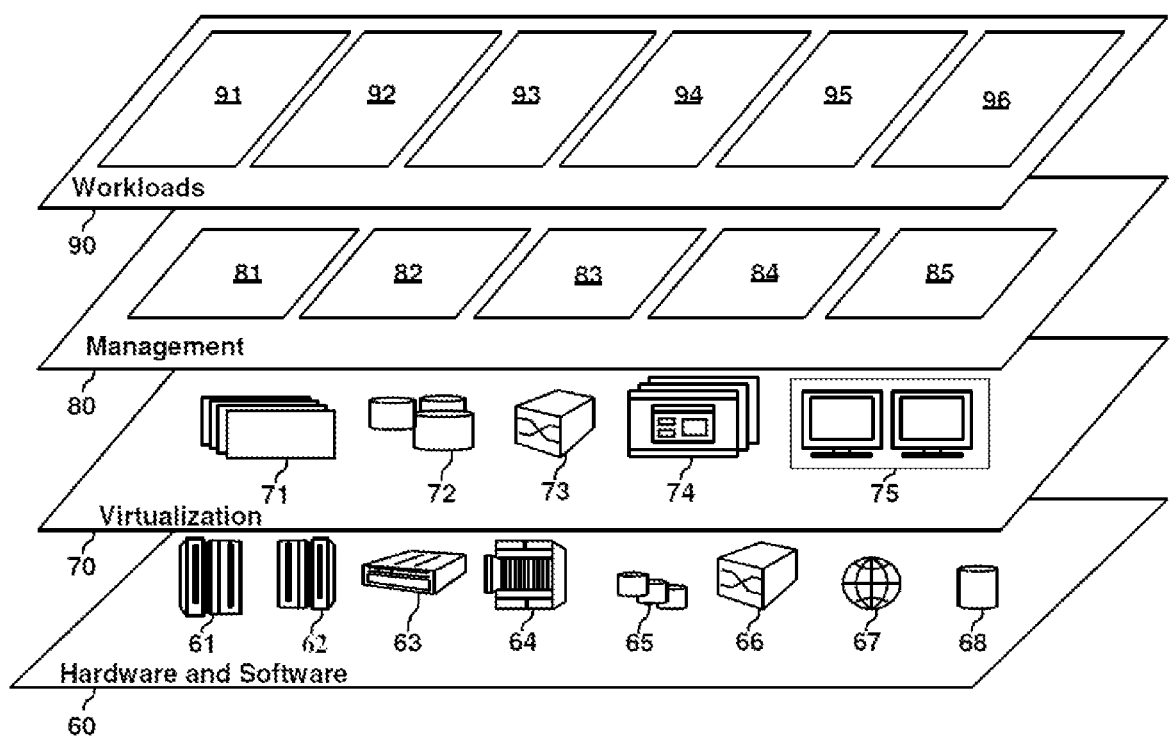
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex tasks related to inferring knowledge inferred from features of composited legacy map documents.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
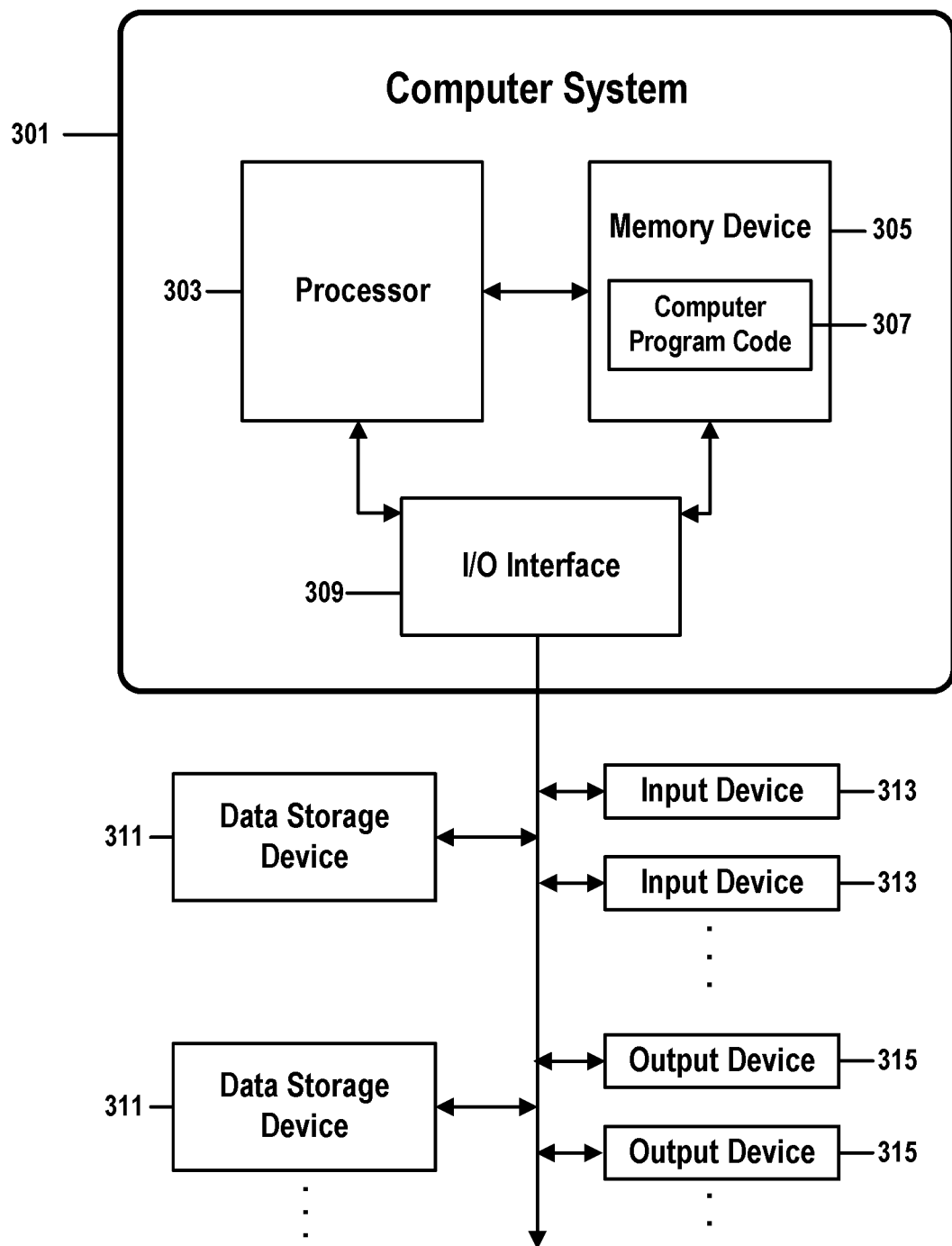
FIG. 3 shows the structure of a computer system and computer program code that may be used to implement a method for cognitive analytics for graphical legacy documents in accordance with embodiments of the present invention.

FIG. 3 shows a structure of a computer system and computer program code that may be used to implement a method for cognitive analytics for graphical legacy documents in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for cognitive analytics for graphical legacy documents in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for cognitive analytics for graphical legacy documents.

Any of the components of the present invention could be created, integrated, hosted, maintained, deployed, managed, serviced, supported, etc. by a service provider who offers to facilitate a method for cognitive analytics for graphical legacy documents. Thus the present invention discloses a process for deploying or integrating computing infrastructure, comprising integrating computer-readable code into the computer system 301, wherein the code in combination with the computer system 301 is capable of performing a method for cognitive analytics for graphical legacy documents.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for cognitive analytics for graphical legacy documents may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for cognitive analytics for graphical legacy documents is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
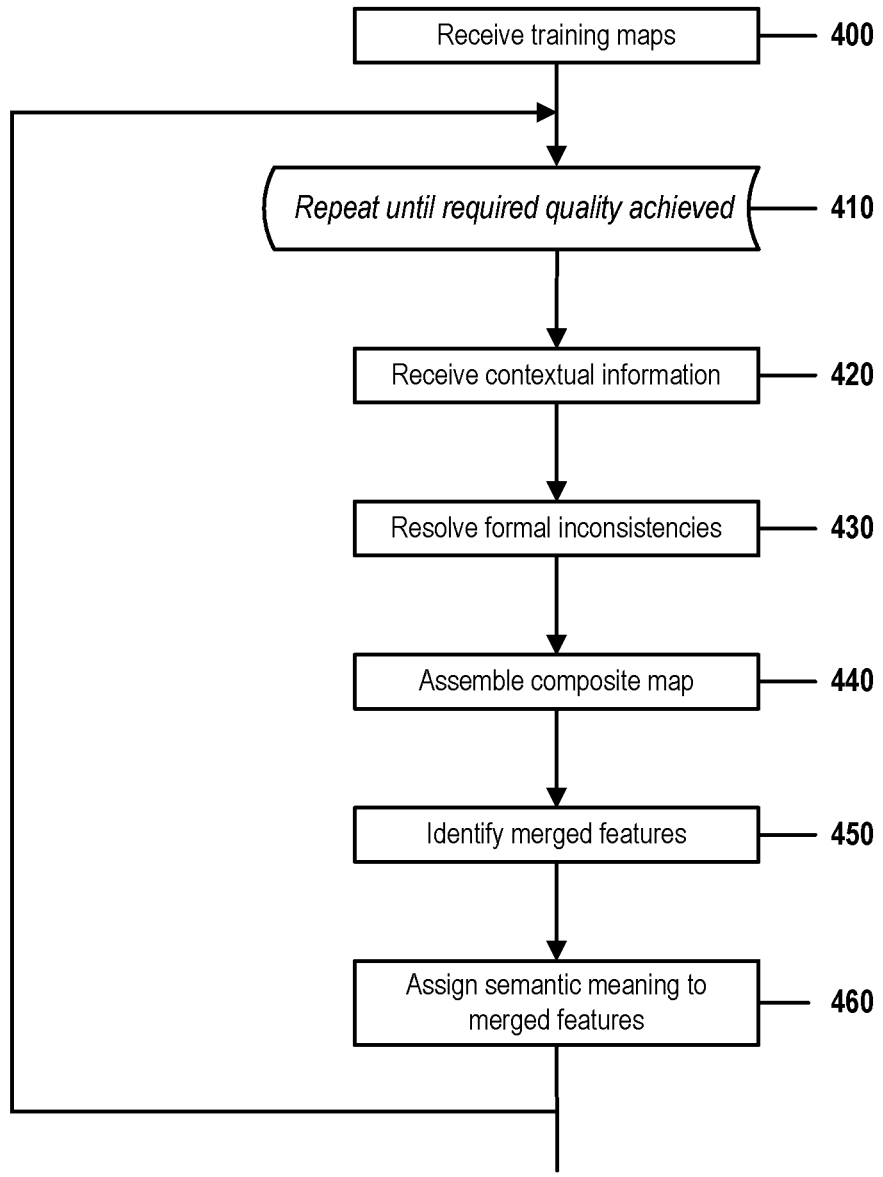
FIG. 4 is a flow chart that illustrates steps of a method for supervised training of a cognitive cartography system in accordance with embodiments of the present invention.

FIG. 4 is a flow chart that illustrates steps of a method for supervised training of a cognitive cartography system in accordance with embodiments of the present invention. FIG. 4 contains steps 400-460.

The method of FIG. 4 may be repeated as many times and as frequently as desired by an implementer. Each performance of this training procedure improves the system's ability to intelligently reconcile and merge legacy maps and to identify the meaning of features of a merged map.

In step 400, the cognitive cartography system receives a set of legacy maps that will be used to train the system. These maps may be received as hardcopy or physical maps that are then scanned or digitized into bitmapped images, or they may be received in digital bitmap form.

Step 410 begins an iterative procedure of steps 410-460. Each iteration of this procedure further refines the quality of the output of steps 410-460, and the iterative procedure continues to repeat until the output is deemed to be of sufficient quality to constitute a completed training session.

Implementers may use any method known in the art to determine whether the training output is of sufficient quality. For example, an implementer might arbitrarily define a fixed number of repetitions of the iterative procedure, as a function of the implementer's expert knowledge of the system's technical constraints or resource constraints. In another example, an implementer could deem the output to be of sufficient quality when an additional performance of the iterative procedure does not change certain benchmark characteristics or elements of the output or when the number or magnitude of such changes fall within a predefined threshold range. In yet other examples, an implementer would terminate performance of the method of FIG. 4 when the number of manual interventions required to perform an iteration falls below a predefined threshold or when errors or missing data items produced by the current iteration fall below a certain number.

In step 420, the cognitive cartography system receives contextual information that can be used to interpret characteristics and features of the received maps. In some cases, this data may be received from a human trainer during a supervised machine-learning training session. In other cases, the system may be configured to be a self-learning, cognitive, or artificially intelligent application capable of interpreting structured or unstructured contextual information without human intervention.

In either case, the contextual information may comprise any sort of reference or contextual data from which may be inferred rules for resolving formal differences among the received legacy maps, of facilitating isolation or identification of map features, or of helping the system to associate semantic meanings with particular map features.

This information may include a conventional machine-training corpus that contains rules, historical records, and relationships that characterize legacy maps. For example, a corpus might contain a rule, or a characterization of a legacy map, indicating that, if a 1979 copyright notice identifying a certain copyright holder in a certain font and color appears in a certain position on a map, then one type of graphical object on that map represents a campsite and a dotted blue line of a certain thickness represents an unimproved dirt road.

Other types of extrinsic contextual information may include unstructured text and graphics that describe characteristics of features found on the legacy maps and of entities described by those features. These extrinsic sources may comprise Web sites, social-media services, books, magazine articles, government documents, scientific papers, presentations and reports, and other types of descriptive and reference materials known in the art, including other maps.

Extrinsic contextual information may also identify knowledge associated with maps and map features that does not directly describe those features. For example, a rainfall map, a map of flood zones, and a topological map showing elevations could be linked together by weather records and logs or maps that document the locations and frequency of past flash-flooding events. This linking could be used to train a cognitive system to predict the likelihood of flooding in a particular area when certain weather conditions occur.

For example, a listing of street addresses in a particular city neighborhood might help the system infer that a certain line thickness and color in a map of that city identifies a paved road. Similarly, a description of hiking trails in a mountainous region could be interpreted by a natural-language processing (NLP) front-end to help the system identify features that represent trails in that region, even if each map represents those trails differently.

Contextual information may also be used to resolve formal inconsistencies between maps. For example, two maps that respectively depict overlapping areas of the same region may each contain features that are omitted from the other map. This may occur, for example, if a map was originally created for a specialized purpose or because one map's level of detail is much greater than that of the other map. In such cases, extrinsic information describing certain characteristics of the overlapping area, or geographical entities located within the overlapping area, could help the system infer that the two maps represent areas of the same region, identify the region relative to regions represented by other received maps, align the orientation or scaling of the two maps, or fit the adjusted maps together into a composite map.

When the method of FIG. 4 comprises supervised training conducted or overseen by a human operator, all or in part of the contextual information may be manually provided by the operator. For example, in subsequent steps of the method of FIG. 4, the human operator may manually associate a certain graphical object on a map with a particular semantic meaning, such as associating a yellow star with a state capital. Similarly, the operator may manually rescale a map to better align a common border shared with an adjacent map, or may identify to the system features that represent the same entity on different maps.

Map legends and scales can be another source of contextual information because they represent information in a structured manner, such as easily interpreted text. Although an embodiment may in some cases be forced to use generalized rules to determine how to rescale maps to a common degree of magnification or determine the meaning of a particular graphical object on a map, these types of tasks may be performed more simply and with greater assurance of accuracy by inferring meaning from the maps' legends. For example, an embodiment would know that a black dot on one map and a blue square on another map identify the same feature if those graphical objects are both identified in the two maps' legends.

Many other types of training materials may be received in this step, as is known in fields like machine-learning, self-learning software, cognitive computing, and artificial intelligence. In all cases, these materials are submitted with the goal of training the system to determine how to best reconcile differences among legacy maps, merge the reconciled maps into a composite map, assign semantic meaning to features of the reconciled maps or merged map, and use these results to derive new rules and knowledge from the merged map.

In step 430, the cognitive cartography system uses the received knowledge to resolve formal inconsistencies among the maps. The system could, for example, resample all of the legacy maps to a common resolution, where that resolution is identified as the best compromise between quality and resource consumption or as a minimum resolution capable of satisfying minimum requirements for map detail or accuracy. In other examples, the system might: rotate certain of the legacy maps such that all maps are aligned with a horizontal east-west axis; add specialized features like contour lines to regions represented by maps that originally lacked those features; reconcile all maps' use of color to conform to a common standard; or apply image-editing filters to certain maps such that all maps represent features by means of the same type of 3D-to-2D projection.

In step 440, the system assembles the reconciled legacy maps into a composite map. This may be performed by any means known in the art, such as by overlaying the maps such that common boundaries overlap. This procedure is facilitated by the actions of step 430, in which the maps are adjusted to allow the maps to be more simply fitted together.

When two maps overlap, the two maps may both contain graphical features that represent the same geographical in the overlapping area. When this occurs, embodiments of the present invention allow an implementer to configure the system to choose the graphical feature that is associated with the most relevant metadata, is more precisely or accurately positioned in the overlapping area, has undergone the least amount of processing in step 430, or is most likely to accurately represent a physical entity. These determinations may be based on the known overall relative accuracy, resolution, precision, or other characteristics of each map.

This step does not require the creation or display of an actual graphical object representing the merged map. Although some embodiments may create such a graphical rendering, a viewable merged map is not the primary object of the method of FIG. 4. At the conclusion of step 440, the system will have generated a mathematical or other type of computerized model of the merged map that comprises data structures identifying characteristics of the merged map, of features of the merged map, and of information associated with the map. This data structure could, for example, be a set of database tables, an array of vectors, a directed graph, or a combination of such items.

The merged-map model may be structured in any manner known in the art. The model can, for example, be organized as a relational database or data structure in which each relevant feature of the composite map is associated with corresponding inferences, semantic meanings, or elements of knowledge. In another example, the model may represent the composite map or its features as a directed or undirected graph that assigns a particular semantic meaning to multiple features or that associates a particular feature with multiple semantic meanings. The present invention is flexible enough to accommodate embodiments comprising any known type of model desired by an implementer or known in the fields of artificial intelligence or computerized modeling.

In all cases, the model will represent the merged map as a set of features and characteristics of each feature. The model will have the ability to associate each feature with information related to a semantic meaning of a corresponding feature or with other types of knowledge that may be inferred from characteristics of the merged map. In some embodiments, the model may store similar or analogous information for some or all of the legacy maps. The model will be able to accommodate additional knowledge that may be inferred by the system from the contents of the merged map, or of any of the original legacy maps. The system may generate these inferences by cognitive means, as a function of training given to the system during the method of FIG. 4, or through intelligence and experience garnered through other means, such as by analyzing feedback received in response to prior performances of a procedure of FIG. 4 or 5.

In step 450, the system identifies features of the merged map that have been generated by merging duplicate features originating in two or more of the original legacy maps, that have been identified through the manual input of a human operator, or that have been intelligently added to the merged map by the system through cognitive means as a function of training and prior experience.

These merged-map features should conform to reconciled conventions derived in step 430 or 440. For example, if the legacy maps use a dozen distinct types of lines to represent a county border, the system will have resolved this inconsistency by loading the model with information identifying features represented by all twelve types of lines as county borders. One of these features, for example, could have been generated from a set of representations of a particular county border originally retrieved from twenty legacy maps. The reconciliations identified in step 430 would have allowed the system to determine that the twenty legacy map features all represented the same border. The system would then overlay or otherwise compare these twenty representations, optionally giving greater weight to those representations that are known to be more accurate, current, or precise. The result would be a refined county-border feature that is at least as accurate and precise as the most accurate or precise of the twenty legacy border features.

At the conclusion of step 450, the cognitive cartography system will have augmented or extended the merged-map model generated in step 440. The system may have used experience gained from previous machine-learning training sessions to add or refine features of the merged map, or those features may have been identified by a human trainer or training system.

In step 460, the system assigns semantic meaning to the merged features. The system may also associate new knowledge with certain merged features by extrapolating previously learned rules and inferences.

In one example, the system will have been taught during prior training that a higher-elevation stream passing through closely spaced contour lines in one region of a legacy map indicated that the region is vulnerable to flooding. Even if no analogous knowledge or inferences are provided or derived for other legacy maps, the system will be able to extrapolate this learning to other areas of the merged map model that may be derived from other legacy maps. The system would thus be able to add knowledge to the merged-map model that identifies physically similar areas of the merged map as being vulnerable to flooding.

In another example, the system has learned that a particular infrastructure configuration in a first legacy map—such as a freeway exit that merges onto a traffic circle is consistently associated with rush-hour traffic congestion. The system could use this learned knowledge to identify similar infrastructure configurations in other regions of the merged map and to then add knowledge to the model specifying that those similar configurations are likely to cause similar traffic problems. This would be possible even if the similar configurations originated from legacy maps that comprised no traffic information and for which no extrinsic traffic-flow data could be obtained, and even if the similar configurations had been represented on those legacy maps in a manner different from the way that the particular infrastructure configuration had been represented in the first legacy map. The resulting, automatically generated, traffic-congestion knowledge could then be forwarded to a downstream system that generates requirements for an infrastructure-planning project.

Many other types of knowledge may be added to the model in this manner. In some cases, the knowledge, or rules used by the system to add the knowledge, may be manually submitted by a human or automated operator during a supervised training session. In other cases, the system may generate or refine the knowledge or the rules by itself, based on prior training or on self-learned experience.

At the conclusion of step 460, the system will have generated and enhanced a merged-map model that associates features and characteristics of the merged map with semantic meaning and related knowledge. The knowledge incorporated into such intelligent merged-map models may be used to support a variety of downstream systems in applications like traffic-management, hydrology, infrastructure-development, urban planning, flood-control, weather-monitoring, erosion-control, and zoning regulation.

Step 460 concludes the current iteration of iterative procedure of step 410-460. The system then returns to step 410 to determine whether another iteration of the procedure of steps 410-460 should be performed. As noted in the description of step 410, if the merged-map model is of sufficient quality, the method of FIG. 4 will end. The merged-map model, being part of a training exercise, may be discarded or, at the discretion of the human or automated trainer, may be retained for analysis or used in an actual production effort.

If the model is not yet of sufficient quality, accuracy, precision, or completeness, the system repeats certain steps of the procedure of steps 420-460. This repetition may comprise receiving additional contextual information in step 420, using that additional information in step 430 to further refine and reconcile the latest versions of the legacy maps, assemble these refined maps into an updated version of the merged-map model in step 440, and further update the model with additional knowledge and rules derived from this latest iteration of steps 410-460.

This iterative procedure repeats in this manner until additional iterations of the procedure do not produce significant improvements to the merged-map model or until the training session is otherwise deemed to be complete.

Figure 5:
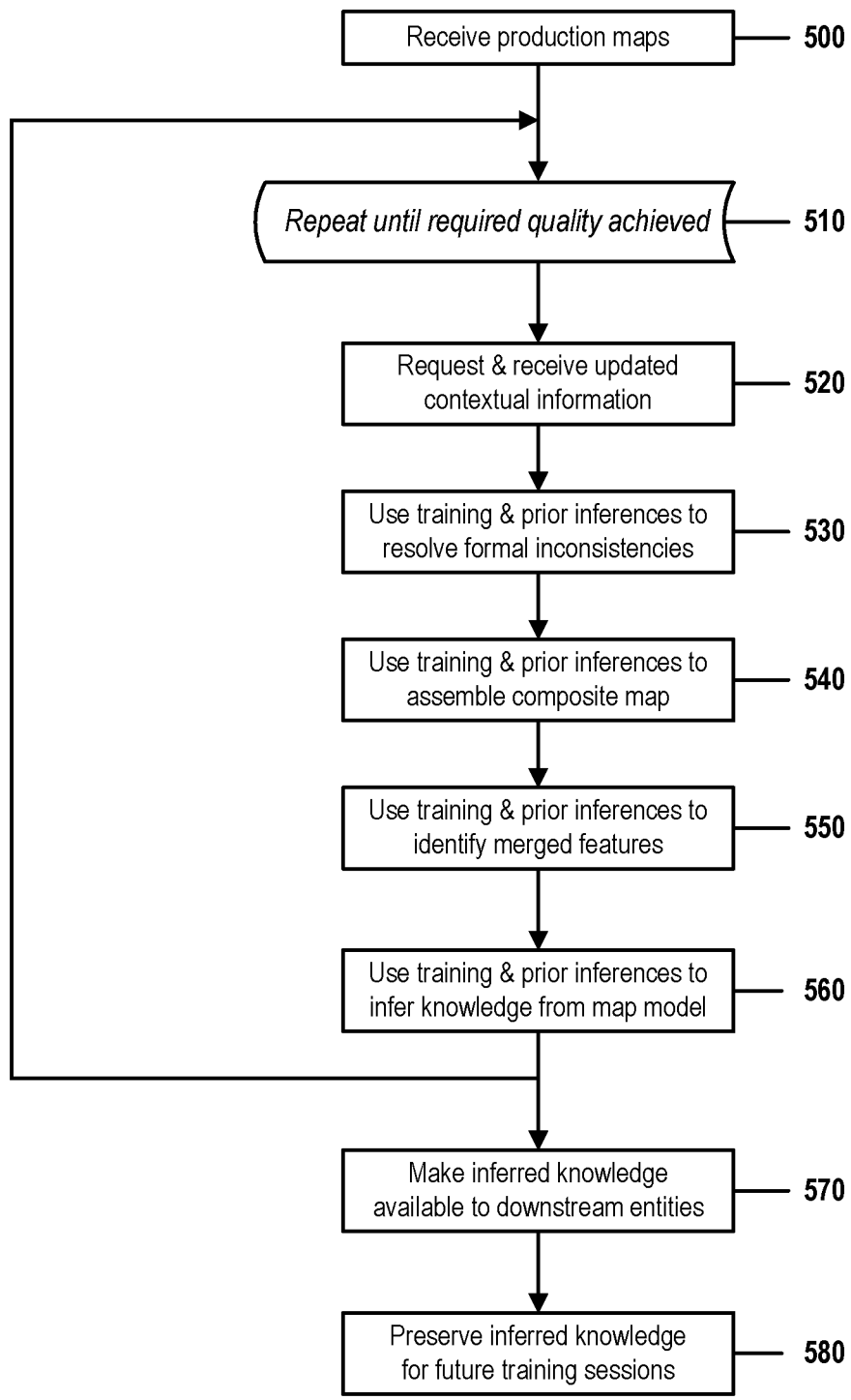
FIG. 5 is a flow chart that illustrates steps of a method for cognitive analytics for graphical legacy documents in accordance with embodiments of the present invention.

The training gained by the cognitive cartography system during performance of the method of FIG. 0.4 will be used by the system in production sessions like those of the method of FIG. 5.

FIG. 5 is a flow chart that illustrates steps of a method for cognitive analytics for graphical legacy documents in accordance with embodiments of the present invention. FIG. 5 contains steps 500-580.

Prior to performance of the method of FIG. 5, performances of the supervised-learning method of FIG. 0.4 will have taught the cognitive cartography system how to infer knowledge from legacy maps without supervision in a production environment. Because the supervised training sessions were designed to teach the system how to perform tasks similar to those required to process production maps, steps of the method of FIG. 5 are analogous to those of FIG. 4.

In step 500, the system receives a set of legacy maps from which will be inferred knowledge about entities represented by the maps. These maps may be received as hardcopy documents or physical maps that are then scanned or digitized into bitmapped images, or they may be received in digital bitmap form.

Step 510 begins an iterative procedure of steps 510-560. Each iteration of this procedure infers knowledge from the received legacy maps, or further refines the quality of the knowledge generated in the previous iteration of step 560 and that will be output in step 570. This iterative procedure repeats until the output is deemed to be of sufficient quality to satisfy requirements selected by an implementer. As in step 410 of FIG. 4, an implementer may use any method known in the art to determine whether the output is of sufficient quality.

In step 520, the cognitive cartography system receives contextual information that can be used to interpret characteristics and features of the received maps. In some embodiments, the system expressly requests this information from extrinsic sources identified by the system using rules and knowledge learned from prior training sessions or from prior iterations of the procedure of steps 510-560. For example, if the system identified in a previous iteration that the legacy maps represent four-wheel-drive roads in national parks, the system might select as one source a government agency that gathers statistics about motorized park usage and select as a second source a Web site that publishes information about the current state of park infrastructure. In some embodiments, some or all sources may be identified by configuration settings or by means of input submitted by other systems or by a human administrator.

In yet other cases, the system may use the maps themselves as information sources, such as by means of optical-character recognitions (OCR) technology that allows the system to identify certain bit patterns as representing alphanumeric characters and words, from which the system may intelligently infer semantic meaning. These characters and words may, for example, be comprised by labels, legends, map titles and headings, footnotes, miscellaneous identifiers, copyright notices, annotations, handwritten notes, and other textual information.

As in step 420 of FIG. 4, the contextual information is capable of helping the system perform subsequent steps of the methods of FIGS. 4 and 5. For example, the contextual information may help the system identify and associate meanings with features of the legacy maps, reconcile differences among the legacy maps, or extrapolate inferred knowledge to the merged-map model generated in step 540.

In step 530, the system uses the received knowledge to resolve formal inconsistencies among the maps. This step may be performed in a manner similar to that described in step 440 of FIG. 4 and as a function of prior training and experience.

In step 540, the system assembles the reconciled legacy maps into a composite map that the system represents internally as a merged-map model. This step may be performed in a manner similar to that described in step 440 of FIG. 4, and as a function of prior training and experience. If the current iteration of the procedure of steps 510-560 is not the first iteration of the current performance of the method of FIG. 5, then the system in the current iteration of step 540 may, rather than generating a merged-map model from scratch, may instead only update or refine a model that had been generated during a previous iteration of step 540.

In step 550, the cognitive cartography system identifies merged features of the most recent version of the composite map that have been generated when merging duplicate features originating in two or more of the original legacy maps, that have been identified through extrinsic information, or that have been intelligently added to the composite map by the system through cognitive means as a function of prior training and experience. The system then updates the merged-map model accordingly. This step may be performed in a manner similar to that described in step 450 of FIG. 4.

In step 560, the system assigns semantic meaning to the merged features identified in step 550. The system may also associate new knowledge with certain of these merged features by extrapolating rules and inferences learned during prior training sessions and during previous iterations of the iterative procedure of steps 510-560, and by incorporating new inferences and knowledge derived from contextual information received during the most recent iteration of step 520. This step may be performed in a manner similar to that described in step 460 of FIG. 4.

At the conclusion of step 560, the system returns to step 510 to determine whether another iteration of the procedure of steps 510-560 should be performed. As noted above, if the merged-map model is deemed to satisfy requirements specified by an implementer, the procedure of steps 510-560 will end and the method of FIG. 5 will continue with step 570.

If the model is not yet of sufficient quality, accuracy, precision, or completeness to satisfy implementation requirements, the system begins the next iteration of the procedure of steps 510-560.

In step 570, the cognitive cartography system forwards, or otherwise makes available, the results of most recent iteration of step 560 to a downstream system, to a human administrator, or to another human or automated recipient. This forwarded knowledge may be used by the downstream entity to produce more accurate, precise, or timely output based on intelligence that might otherwise be unavailable.

In step 580, the system forwards, stores, preserves, documents, or otherwise makes available the results of the most recent iteration of step 560 to the entity responsible for training the system. These results will be used during machine-learning sessions comprised by the method of FIG. 4 to teach an instance of the system how to more effectively infer knowledge from legacy maps.

In some embodiments, the system will also make available any feedback that the system receives as a result of forwarding the results to other entities in step 570. This feedback might, for example, include, logs of errors generated when the downstream systems use the forwarded results, user comments about the results, documentation of inconsistencies between the forwarded results and extrinsic information, or documentation of inconsistencies between the forwarded results and results generated by prior performances of a method of FIG. 4 or FIG. 5.

In one example of the procedure of FIG. 5, an embodiment is used to support hydrology-related urban-planning efforts.

Here, the system receives a set of legacy maps that represent areas of a region that is subject to evaluation by a hydrology-engineering project. Some of these maps may incorporate information specific to the field of hydrology, but this need not be the case.

The system has access to rules, archival records, and other types of information stored in the system's knowledgebase. The system receives structured and unstructured extrinsic information that relates to characteristics of the legacy maps or from which knowledge about entities located within the region represented by the legacy maps. This received information may be received from any source deemed relevant by an implementer or identified by the system itself.

In the current example, this received information could include records of drainage structures culled from digital maps retrieved from public records or from filings submitted by government contractors. The information could also include information obtained from a variety of extrinsic sources, such as identifications of geographical and political land-parcel borders, records of water usage by different communities or consumer demographics, or descriptions of watershed boundaries and usage restrictions.

The system will use these resources to intelligently interpret the graphical features on the legacy maps, adjust the legacy maps to conform to a common format, assemble the adjusted maps into a composite map, associate semantic meaning to features of a merged-map model that represents the composite map, and then enhance the model with logic, rules, and other types of knowledge inferred from the resources.

The system first uses the rules, archival data, and other types of received information resources to reconcile formal inconsistencies among the legacy maps that would prevent the legacy maps from being seamlessly fitted together into a composite map. The system performs this task by means of techniques and technologies known in the field of artificial intelligence. These known techniques include pattern-matching algorithms and known methods of using the received information to intelligently determine likelihoods that certain bit patterns on the maps represent meaningful features.

After assembling the legacy maps into a composite map and generating a merged-map model that represents characteristics of the composite map, the system uses the received information, previous training, and previous experience to infer and associated further semantic meaning to features of the merged-map model.

The system would then intelligently correlate knowledge inferred from internal and extrinsic sources with the inferred semantic meanings comprised by the merged-map model. These correlations could be performed by any inferential method known in fields related to the field of artificial intelligence. These correlations could generate new, useful knowledge related to areas of the composite map that had previously been represented solely by graphical legacy maps. This knowledge would then be transmitted to downstream applications and engineering teams associated with the hydrology project or to other systems that require similar data.

For example, the newly generated knowledge could be inferred from sources like:
  geographical-rainfall analyses useful to flood-warning systems;
  historical utilization figures related to waterway-management;
  drainage analysis for catchment, submergence, and other types of studies;
  associations that relate irrigation infrastructure to the quality of water supplies;
  hydro-geological analysis that relate geological features to water distribution; and
  historical records that help identify trends in water utilization or availability.

The newly generated knowledge may allow the system to produce many types of reports, tables, charts, associations, and correlations, depending on details of the received extrinsic information, on the rules, logic, and records stored in the knowledgebase, on the details of training previously received by the system, and on the characteristics and content of the legacy maps.

Other embodiments may, through similar methods, generate new knowledge useful to engineering teams, applications, and planning systems in fields as diverse as traffic management, transport planning, facility planning, cellular-network infrastructure design, urban planning, zoning regulation, natural-resource conservation, flood control and drought control, erosion reduction, construction permitting, and land-grant management. Many other applications are possible in other fields that require consideration of geophysical, geological, or geopolitical factors.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

In particular, embodiments and examples described in this document may comprise the processing of legacy maps. But this should not be construed to limit embodiments of the present invention to map documents. The inventive concept described in this document is broad enough to accommodate the processing of any sort of graphical bitmapped image or hardcopy graphical image, using methods and technologies similar to those described above. For example, embodiments could be used to infer semantic meaning from two-dimensional photographs of a city skyline or of another complex set of objects, use these inferences to assemble the photographs into a composite image, use prior training, experience, and inferences to infer knowledge from the composite image, and then forward that knowledge to a downstream system.

What is claimed is:

1. A cognitive cartography system comprising a processor, a memory coupled to the processor, and a computer-readable hardware storage device coupled to the processor, the storage device containing program code configured to be run by the processor via the memory to implement a method for cognitive analytics for graphical legacy documents, the method comprising:

the cognitive cartography system receiving a set of legacy maps, each of which is a bitmapped representation of a subset of a geographical region;

the cognitive cartography system, by means of artificial intelligence, adjusting the legacy maps to reconcile formal inconsistencies among the legacy maps;

the cognitive cartography system assembling the adjusted maps into a composite map that is represented by a merged-map model;

the cognitive cartography system inferring semantic meanings of features comprised by the composite map;

the cognitive cartography system associating the composite map with knowledge derived from the semantic meanings and from contextual information received from at least one extrinsic source;

the cognitive cartography system adding the inferred semantic meanings and the associated knowledge to the merged-map model; and the cognitive cartography system making available at least part of the merged-map model to a downstream system.

2. The cognitive cartography system of claim 1, where the cognitive cartography system performs the adjusting, the assembling, the inferring, and the associating according to rules derived from prior machine-learning training sessions.

3. The cognitive cartography system of claim 1, where the cognitive cartography system performs the adjusting, the assembling, the inferring, and the associating according to rules derived from prior performances of the adjusting, the assembling, the inferring, and the associating.

4. The cognitive cartography system of claim 1, where the cognitive cartography system performs the adjusting, the assembling, the inferring, and the associating according to rules derived from an analysis of feedback previously received from the downstream system in response to the downstream system's receipt of an earlier merged-map model from the cognitive cartography system.

5. The cognitive cartography system of claim 1, where the contextual information comprises textual information that is distinct from the legacy maps and that describes a characteristic of the geographical region.

6. The cognitive cartography system of claim 1, where the formal inconsistences comprise differences in parameters selected from the group consisting of: bit resolution, orientation, precision, legend convention, labeling convention, level of detail, map projection, viewing angle, color-usage convention, and scale.

7. The cognitive cartography system of claim 1, further comprising:

the cognitive cartography system responding to a receipt of additional contextual information by repeating the adjusting, the assembling, the inferring, the associating, and the making available.

8. The cognitive cartography system of claim 1, further comprising:

the cognitive cartography system repeating the adjusting, the assembling, the inferring, and the associating until the merged-map model satisfies a predetermined threshold condition.

9. A method for cognitive analytics for graphical legacy documents, the method comprising:

a cognitive cartography system receiving a set of legacy maps, each of which is a bitmapped representation of a subset of a geographical region;

the cognitive cartography system, by means of artificial intelligence, adjusting the legacy maps to reconcile formal inconsistencies among the legacy maps;

the cognitive cartography system assembling the adjusted maps into a composite map that is represented by a merged-map model;

the cognitive cartography system inferring semantic meanings of features comprised by the composite map;

the cognitive cartography system associating the composite map with knowledge derived from the semantic meanings and from contextual information received from at least one extrinsic source;

the cognitive cartography system adding the inferred semantic meanings and the associated knowledge to the merged-map model; and the cognitive cartography system making available at least part of the merged-map model to a downstream system.

10. The method of claim 9, where the cognitive cartography system performs the adjusting, the assembling, the inferring, and the associating according to rules derived from prior machine-learning training sessions.

11. The method of claim 9, where the cognitive cartography system performs the adjusting, the assembling, the inferring, and the associating according to rules derived from prior performances of the adjusting, the assembling, the inferring, and the associating.

12. The method of claim 9, where the cognitive cartography system performs the adjusting, the assembling, the inferring, and the associating according to rules derived from an analysis of feedback previously received from the downstream system in response to the downstream system's receipt of an earlier merged-map model from the cognitive cartography system.

13. The method of claim 9, further comprising:

the cognitive cartography system repeating the adjusting, the assembling, the inferring, and the associating until the merged-map model satisfies a predetermined threshold condition.

14. The method of claim 9, further comprising providing at least one support service for at least one of creating, integrating, hosting, maintaining, and deploying computer-readable program code in the computer system, wherein the computer-readable program code in combination with the computer system is configured to implement the adjusting, the assembling, the inferring, the associating, and the making available.

15. A computer program product, comprising a computer-readable hardware storage device having a computer-readable program code stored therein, the program code configured to be executed by a cognitive cartography system comprising a processor, a memory coupled to the processor, and a computer-readable hardware storage device coupled to the processor, the storage device containing program code configured to be run by the processor via the memory to implement a method for cognitive analytics for graphical legacy documents, the method comprising:

the cognitive cartography system receiving a set of legacy maps, each of which is a bitmapped representation of a subset of a geographical region;

the cognitive cartography system, by means of artificial intelligence, adjusting the legacy maps to reconcile formal inconsistencies among the legacy maps;

the cognitive cartography system assembling the adjusted maps into a composite map that is represented by a merged-map model;

the cognitive cartography system inferring semantic meanings of features comprised by the composite map;

the cognitive cartography system associating the composite map with knowledge derived from the semantic meanings and from contextual information received from at least one extrinsic source;

the cognitive cartography system adding the inferred semantic meanings and the associated knowledge to the merged-map model; and the cognitive cartography system making available at least part of the merged-map model to a downstream system.

16. The computer program product of claim 15, where the cognitive cartography system performs the adjusting, the assembling, the inferring, and the associating according to rules derived from prior machine-learning training sessions.

17. The computer program product of claim 15, where the cognitive cartography system performs the adjusting, the assembling, the inferring, and the associating according to rules derived from prior performances of the adjusting, the assembling, the inferring, and the associating.

18. The computer program product of claim 15, where the cognitive cartography system performs the adjusting, the assembling, the inferring, and the associating according to rules derived from an analysis of feedback previously received from the downstream system in response to the downstream system's receipt of an earlier merged-map model from the cognitive cartography system.

19. The computer program product of claim 15, where the contextual information comprises textual information that is distinct from the legacy maps and that describes a characteristic of the geographical region.

20. The computer program product of claim 15, further comprising:

the cognitive cartography system repeating the adjusting, the assembling, the inferring, and the associating until the merged-map model satisfies a predetermined threshold condition.

\* \* \* \* \*